United States Patent Office 2,793,128
Patented May 21, 1957

2,793,128

REFRACTORY COMPOSITIONS AND BONDING AGENTS THEREFOR

Donald E. Emhiser, Brackenridge, Pa., assignor to Pittsburgh Plate Glass Company, Allegheny County, Pa., a corporation of Pennsylvania No Drawing. Application January 17, 1955, Serial No. 482,415

14 Claims. (Cl. 106—64)

This invention relates to refractory compositions and more especially relates to improvements in compositions containing calcium aluminate cement, i. e., hydraulic-setting calcium aluminate.

Calcium aluminate in substantially anhydrous form is a hydraulic-setting cement and thus can be used as a bonding agent for various aggregates and insulating materials. These compositions in which hydraulic-setting calcium aluminate is the bonding agent produce refractory articles which in the unfired condition have lower strengths than corresponding refractory articles made using Portland cement as the bonding material. However, the refractory articles in which calcium aluminate is used as the bonding agent retain more of their strength after firing to higher temperatures than is the case with the refractory bodies using Portland cement as the bonding agent. The compositions heretofore obtainable with hydraulic-setting calcium aluminate as the bonding agent have produced refractory articles of such low strength and are so fragile in the unfired condition that chipping of the articles occurs during handling. In attempts to improve the strength of the unfired refractory article, the water content was reduced in the mixture containing the aggregate or insulating material and the hydraulic-setting calcium aluminate cement. This resulted in a mix which did not have satisfactory workability.

It is an object of the present invention to provide compositions containing hydraulic-setting calcium aluminate as a bonding agent for aggregates and insulating material for the formation of refractory articles having improved unfired strength.

It is another object of this invention to provide compositions containing hydraulic-setting calcium aluminate suitable for use as bonding agent with aggregates and insulating materials in which the amount of water used per casting can be minimized and in which the mix containing the water, aggregate or insulating material and hydraulic-setting calcium aluminate has satisfactory working characteristics.

It is still a further object of the present invention to provide compositions in which hydraulic-setting calcium aluminate can be used as a bonding agent in a reduced amount with insulating materials in order to form refractory articles with insulating characteristics.

These and other objects will be apparent to one skilled in the art from the description which follows.

I have found that refractory articles made with hydraulic-setting calcium aluminate as a bonding agent have improved unfired strength when the compositions containing the hydraulic-setting calcium aluminate also contain a minor amount, based on the hydraulic-setting calcium aluminate content, of sodium aluminate. The amount of sodium aluminate used is from about 1 to 20 percent by weight based on the weight of hydraulic-setting calcium aluminate and the preferred range is from about 4 to 12 percent by weight. Sodium aluminate is $NaAlO_2$ and it is commercially available as a dry powder.

Sodium aluminate may be added to the compositions of this invention in several ways. It may be mixed with the cement in the relative amounts recited above and the resulting compositions can be used for forming the refractory bodies by mixing with the aggregate or insulating materials and water. In another method, of course, the sodium aluminate can be provided in the final mixture by adding it to the mixture of hydraulic-setting calcium aluminate, aggregate or insulating material, and water. It can be added as powder or it can be added in the form of an aqueous solution in which the water of the solution is part of the water of the final mixture.

The compositions of the present invention include compositions containing hydraulic-setting calcium aluminate and sodium aluminate which can be used for bonding various aggregates such as fused silica, fire brick, alumina and kaolin. The combined amount of sodium aluminate and hydraulic-setting calcium aluminate is from about 10 to 40 percent by weight of the total weight of the solids. The compositions of the present invention containing sodium aluminate and hydraulic-setting calcium aluminate can also be used as compositions also containing various insulating materials for forming refractory articles. Examples of insulating materials are asbestos, diatomaceous earth, vermiculite, insulating fire brick and pearlite. The combined amount of hydraulic-setting calcium aluminate and sodium aluminate in these compositions for producing insulating refractory articles is from about 25 to 60 percent by weight of the total weight of solids.

The amount of water used in all of these fluid compositions containing either aggregates or insulating material can be varied widely. The amount is dependent on whether or not a refractory article is to be formed by the puddling technique or by the pressing technique. Furthermore, the amount of water is dependent upon the amount of hydralic-setting calcium aluminate as well as whether aggregate, or insulating material, or a mixture of aggregate and insulating material is used. When the refractory articles are to be made by means of the puddling technique, the amount of water used is to the order of 15 to 100 percent by weight of the combined weight of solids. When using the pressing technique the amount of water used is from 10 to 70 percent by weight of the combined weight of solids and the lower portion of this range of water content is used when an aggregate is used. The upper portion of water content range is used in compositions containing an insulating material and the hydraulic-setting calcium aluminate, the latter being present in the lower portion of its content range.

In the following illustrative examples of compositions of the present invention and their utilization for the formation of refractory articles a shredded alumina-silica ceramic fiber was used as the insulating material. Similar improved results in improved unfired strength can be obtained with other insulating materials and with aggregates in place of the shredded ceramic fiber. The fibers used had diameters of about 10 microns or less and the fibers were shredded until the maximum fiber length was about ¼ inch. The ceramic fiber had the following chemical analysis: 50.19% $Al_2O_3$: 48.50% $SiO_2$: 0.07% $Fe_2O_3$: 0.04% $TiO_2$: 0.03% CaO: and 1.0% alkali metal oxides. These percentages are weight percentages. Such fibers can be made, for example, as described in U. S. Patent No. 2,557,834 titled "Refractory Glass Wool" and granted to John C. McMullen on June 19, 1951.

In two compositions in the following illustrative examples diatomaceous earth was used. It was minus 65-mesh material.

The commercial grade of hydraulic-setting calcium aluminate used in the following examples had the following chemical composition by weight after drying at 212° F.: 35.95% CaO; 37.50% Al₂O₃; 15.26% Fe₂O₃; 7.43% SiO₂; 2.08% TiO₂; 1.19% MgO; 0.19% MnO; 0.15% Na₂O; 0.24% SO₃; 0.17% P₂O₅; and 0.28% loss on ignition. The moisture content of 0.24% was determined in the 212° F. drying operation.

*Example I*

Nine hundred grams of the shredded alumina-silica fiber and 600 grams of the hydraulic-setting calcium aluminate were thoroughly mixed and then 1050 grams of water were added. The resulting mixture was then used to make three bars 1" x 1" x 4½" by placing portions of the mixture into molds followed by tamping. The bars were removed from the molds and then were covered for 24 hours with moist cloths to prevent moisture evaporation while the calcium aluminate was setting. The bars were next placed in a drier at 212° F. for about 12 hours at which point they had reached a constant weight. The dried bars were subjected to strength determination and the average of the modulus of rupture at room temperature was 202 p. s. i.

In the foregoing example it will be noted that the amount of water based on amount of total solids was 70%. If the amount of water used is reduced from this percentage the mixture will not have satisfactory working characteristics.

*Example II*

Three bars were made and tested as in Example I except the ingredients used were 240 grams of the shredded alumina-silica ceramic fiber, 160 grams of the hydraulic-setting calcium aluminate, 8 grams of sodium aluminate and 240 cc. of water. The room temperature modulus of rupture of the unfired bars was an average value of 236 p. s. i.

It will be noted that the amount of sodium aluminate used was 5% by weight of the hydraulic-setting calcium aluminate content and with this amount of sodium aluminate it was found possible to use this low amount (60% based on amount of total solids) of water while retaining satisfactory working characteristics. The result was the improved modulus of rupture for the refractory bars produced. Even with the use of the smaller amount of water the composition had better working characteristics than the composition of Example I in which the amount of water was 70% by weight of the weight of total solids.

*Example III*

Three bars were made and tested as in Example I. The amounts of materials used were 240 grams of the shredded alumina-silica ceramic fiber, 160 grams of the hydraulic-setting calcium aluminate, 16 grams of sodium aluminate and 200 cc. of water. The average modulus of rupture was 272 p. s. i. The preparation and testing of these bars show that by the use of sodium aluminate in this concentration, namely, 10% by weight of the weight of hydraulic-setting calcium aluminate, it is possible to utilize a mixture containing only 50% by weight of water based on the weight of total solids for satisfactory working characteristics and the unfired product obtained has considerably higher strength than the product of Example I.

*Example IV*

Five bars were made and tested as in Example I. The original mixture of solids was made using 240 grams of the shredded alumina-silica ceramic fiber, 120 grams of the hydraulic-setting calcium aluminate and 40 grams of diatomaceous earth. To this mixture was added 220 cc. of water. The average modulus of rupture at room temperature of the unfired bars was only 33 p. s. i.

The foregoing strength of refractory bars using diatomaceous earth show that diatomaceous earth, which is incorporated for improvement of working characteristics, has a considerable deleterious effect on the unfired strength of the refractory articles.

*Example V*

Four bars were made and tested as in Example I. These bars were made using the ingredients recited in Example IV in the same amounts and in addition the composition contained 16 grams of sodium aluminate. The average modulus of rupture at room temperature of the unfired bars was 275 p. s. i.

The use of sodium aluminate overcame the deleterious effect of diatomaceous earth on the unfired strength. Diatomaceous earth can be used in the compositions in the range of about 5 to 20 percent by weight based upon the weight of total solids to improve working characteristics. The preferred range of diatomaceous earth content is from about 8 to 12 percent.

The refractory compositions containing shredded alumina-silica fiber, calcium aluminate and sodium aluminate with or without diatomaceous earth are useful as window glass roll covering materials, when the shredded fiber is free of alumina-silica pellets normally produced with the fiber.

The foregoing examples are merely for purpose of illustration of the present invention which is to be limited only by the claims which follow.

I claim:

1. A composition comprising a hydraulic-setting bonding agent consisting essentially of a hydraulic-setting calcium aluminate and sodium aluminate, said sodium aluminate constituting from about 1 to 20 percent by weight of the weight of the hydraulic-setting calcium aluminate, said sodium aluminate increasing the unfired strength provided by said hydraulic-setting calcium aluminate as a bonding agent.

2. The composition of claim 1 wherein the amount of sodium aluminate is between about 4 and 12 percent by weight of the weight of the hydraulic-setting calcium aluminate.

3. A composition comprising diatomaceous earth and a hydraulic-setting bonding agent consisting essentially of a hydraulic-setting calcium aluminate and sodium aluminate, said sodium aluminate constituting from about 1 to 20 percent by weight of the weight of the hydraulic-setting calcium aluminate, said sodium aluminate increasing the unfired strength provided by said hydraulic-setting calcium aluminate as a bonding agent.

4. The composition of claim 3 wherein the amount of sodium aluminate is between about 4 to 12 percent by weight of the weight of the hydraulic-setting calcium aluminate.

5. A fluid composition suitable for forming a refractory article comprising an aggregate, water and a hydraulic-setting bonding agent consisting essentially of a hydraulic-setting calcium aluminate and sodium aluminate, said sodium aluminate constituting from about 1 to 20 percent by weight of the weight of the hydraulic-setting calcium aluminate.

6. A fluid composition suitable for forming an insulating refractory article comprising an insulating material, water and a hydraulic-setting bonding agent consisting essentially of a hydraulic-setting calcium aluminate and sodium aluminate, said sodium aluminate constituting from about 1 to 20 percent by weight of the weight of hydraulic-setting calcium aluminate.

7. The composition of claim 6 wherein the insulating material is shredded alumina-silica ceramic fiber.

8. A fluid composition suitable for forming refractory articles comprising shredded alumina-silica ceramic fiber, diatomaceous earth, water and a hydraulic-setting bonding agent consisting essentially of a hydraulic-setting calcium aluminate and sodium aluminate, said sodium aluminate constituting from about 1 to 20 percent by weight based on the weight of hydraulic-setting calcium aluminate.

9. The composition of claim 8 wherein the sodium aluminate content is between about 4 and 12 percent by weight of the weight of the hydraulic-setting calcium aluminate.

10. A hydraulic-setting bonding composition for refractories consisting essentially of a hydraulic-setting calcium aluminate and sodium aluminate, said sodium aluminate constituting from about 1 to 20 percent by weight of the weight of the hydraulic-setting calcium aluminate.

11. A refractory body consisting essentially of an aggregate bonded by a hydraulic-set bonding agent consisting of a hydraulic-set calcium aluminate and sodium aluminate, said sodium aluminate constituting from about 1 to 20 percent by weight of the weight of the calcium aluminate.

12. A refractory body consisting essentially of an insulating material bonded by a hydraulic-set bonding agent consisting of hydraulic-set calcium aluminate and sodium aluminate, said sodium aluminate constituting from about 1 to 20 percent by weight of the weight of the calcium aluminate.

13. The refractory body of claim 12 wherein the insulating material is shredded alumina-silica ceramic fiber.

14. A window glass roll having a covering consisting essentially of a shredded alumina-silica ceramic fiber bonded by a hydraulic-set bonding agent consisting of a hydraulic-set calcium aluminate and sodium aluminate, said sodium aluminate constituting from about 1 to 20 percent by weight of the weight of the calcium aluminate, said shredded fiber being substantially free of alumina-silica pellets.

References Cited in the file of this patent

UNITED STATES PATENTS

| | | |
|---|---|---|
| 1,507,379 | Hoskins | Sept. 2, 1924 |
| 2,509,599 | Hollenberg | Dec. 30, 1941 |

FOREIGN PATENTS

| | | |
|---|---|---|
| 530,305 | Great Britain | Dec. 10, 1940 |